Patented Oct. 15, 1946

2,409,189

UNITED STATES PATENT OFFICE 2,409,189

MEROCYANINE DYES

Leslie G. S. Brooker, Rochester, N. Y., and Homer W. J. Cressman, Glenside, Pa., assignors to Eastman Kodak Company, Rochester, N. Y., a corporation of New Jersey No Drawing. Original application September 1, 1942, Serial No. 456,927. Divided and this application April 27, 1945, Serial No. 590,716

7 Claims. (Cl. 260—240)

This invention relates to merocyanine dyes and to a process for the preparation thereof. This application is a division of our copending application Serial No. 456,927, filed September 1, 1942 (now U. S. Patent 2,398,999, dated April 23, 1946) which is a continuation-in-part of our application Serial No. 353,502, filed August 21, 1940 (now U. S. Patent 2,317,357, dated April 27, 1943).

Merocyanine dyes contain a chromophore comprising a polymethine chain, one end of which is attached to the nitrogen atom of the heterocyclic nucleus and the other end of which is attached to a carbonylic oxygen or sulfur atom. In the known merocyanine dyes, the aforesaid nitrogen atom carries an alkyl group, e. g. methyl, ethyl, allyl, benzyl, etc. We have now found that merocyanine dyes can be produced containing a polymethine chain, one end of which is attached to the nitrogen atom of a 3,4-trimethylenebenzothiazole nucleus. This nucleus differs from the nitrogenous heterocyclic nuclei in known merocyanine dyes in that there is a bridge of atoms between the nitrogen atom and another atom in the nucleus. We have also found that our new dyes sensitize photographic silver halide emulsions.

It is, accordingly, an object of our invention to provide new merocyanine dyes. A further object is to provide a process for preparing such dyes. Other objects will become apparent hereinafter.

Merocyanine dyes of our invention can be represented by the following general formula:

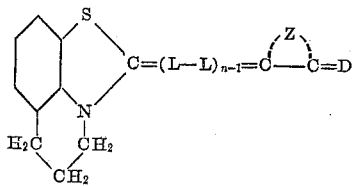

wherein D represents a member selected from the group consisting of oxygen and sulfur, L represents a methine group, $n$ represents a positive integer of from 2 to 3, and Z represents the non-metallic atoms necessary to complete a heterocyclic nucleus containing from 5 to 6 atoms in the heterocyclic ring. More particularly, in the aforesaid general formula, Z represents the non-metallic atoms necessary to complete a 3-alkyl-rhodanine nucleus, a 3-arylrhodanine nucleus, a 2-dialkylamino-4(5)-thiazolone nucleus, a 2-diphenylamino-4(5)-thiazolone nucleus, a 3-alkyl-2-thio-2,4(3,5)-oxazoledione nucleus, a 1,3-diphenyl-2-thiohydantoin nucleus, a 1-phenyl-3-alkyl-5-thiopyrazolone nucleus, a 3-alkyl-1-phenyl-2-thiohydantoin nucleus, a 2-thiobarbituric acid nucleus, etc.

In accordance with our invention, we prepare the merocarbocyanine and merodicarbocyanine dyes represented by the above general formula by condensing a 2-(β-acylarylaminovinyl)- or a 2-(4-acylarylamino-1,3-butadienyl)-3,4-trimethylenebenzothiazole quaternary salt with a heterocyclic compound containing a ketomethylene group in the ring and also containing from 5 to 6 atoms in the ring, e. g. a 3-alkylrhodanine, a 3-arylrhodanine, a 2-dialkylamino-4(5)-thiazolone, a 2-diphenylamino-4(5)-thiazolone, a 3-alkyl-2-thio-2,4(3,5)-oxazoledione, a 1,3-diphenyl-2-thiohydantoin, a 1-phenyl-3-alkyl-5-thiopyrazolone, a 3-alkyl-1-phenyl-2-thiohydantoin, a 2-thiobarbituric acid, etc.

The acylarylamino compounds employed are advantageously aliphatic acylarylamino compounds, e. g. acetylarylamino compounds of the benzene series. The condensations are advantageously carried out in the presence of an acid-binding agent in a medium such as ethyl alcohol, n-propyl alcohol or isopropyl alcohol, for example. Trialkylamines, such as triethylamine, or piperidine are advantageously employed as acid-binding agents.

The following examples will serve to illustrate our new dyes and the manner of obtaining the same:

Example 1.—3-ethyl-5-[(3,4-trimethylene-2(3)-benzothiazolylidene)-ethylidene]-rhodanine

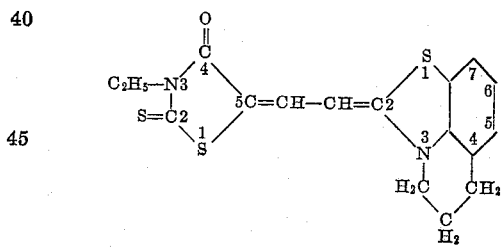

0.3 g. (1 mol.) of 5-acetanilidomethylene-3- ethylrhodanine, 0.32 g. (1 mol.) of 2-methyl-3,4-trimethylenebenzothiazolium iodide and 0.145 cc. (1.05 mol.) of triethylamine were placed in 15 cc. of absolute ethyl alcohol. The mixture was boiled, under reflux, for 20 minutes. The reaction mixture was cooled, the dye filtered off, washed with methyl alcohol and dried in the air. In this manner 0.25 g. (70 per cent yield) of dye was obtained. The dye, after two recrystallizations from a mixture of pyridine and methyl alcohol was obtained in 42 per cent yield, as reddish crystals melting at 288° to 289° C. with decomposition. A solution of the dye in methyl alcohol is pink. The dye sensitized a photographic gelatino-silver-bromiodide emulsion strongly out to 625 mu with a maximum at about 595 mu.

In a similar manner, 2-methyl-3,4-trimethylenebenzothiazolium iodide was condensed with 5-acetanilido-methylene-3-ethyl-2-thio-2,4(3,5)-oxazoledione to give 3-ethyl-5-[(3,4-trimethylene-2(3)-benzothiazolylidene) - ethylidene] - 2-thio-2,4(3,5)-oxazoledione, in a yield of 74 per cent. The dye, after two recrystallizations from a pyradine methyl alcohol mixture was obtained as reddish crystals, melting at 287° to 288° C. A solution of the dye in methyl alcohol was orange. The dye sensitized a photographic gelatino-silver-bromiodide emulsion strongly out to 630 mu with a maximum at about 570 mu.

*Example 2.—3 - methyl-1-phenyl-4[(3,4-trimethylene - 2(3) -benzothiazolylidene) ethylidene]-5-pyrazolone.*

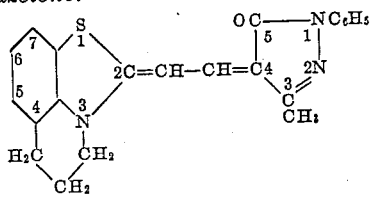

A mixture of 1.6 g. (1 mol.) of 2-β-acetanilidovinyl-3,4-trimethylenebenzothiazolium iodide, 0.6 g. (1 mol.) 3-methyl-1-phenyl-5-pyrazolone, and 0.46 cc. (1 mol.) triethylamine in 25 cc. absolute ethyl alcohol was refluxed 15 minutes. The reaction mixture was chilled and the dye collected on a filter and washed with methanol. Yield: 1.15 g., 92 per cent. It was obtained as minute red crystals, melting at 238° to 239° C. without decomposition, after an extraction with 90 cc. hot methanol and recrystallization of the residue from methyl alcohol (400 cc./g.). A solution of the dye in methyl alcohol is orange. The dye sensitized a photographic gelatino-silver-bromiodide emulsion to 570 mu with a slight maximum at 530 mu.

*Example 3.—5-[(3,4 - trimethylene - 2(3)-benzothiazolylidene)-ethylidene] - 2 - thiobarbituric acid*

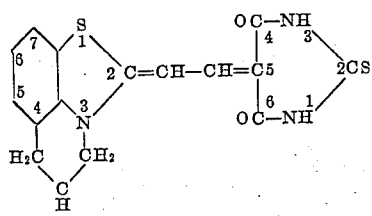

A mixture of 1.6 g. (1 mol.) 2-β-acetanilidovinyl-3,4-trimethylenebenzothiazolium iodide, 0.5 g. (1 mol.) thiobarbituric acid, and 0.46 cc. (1 mol.) triethylamine in 50 cc. absolute ethyl alcohol was refluxed for 15 minutes. The dye separated from the hot solution. After cooling, it was collected on a filter and washed well with methanol. Yield: 1.15 g., 100 per cent. The very insoluble dye was extracted with 100 cc. hot pyridine and filtered. The residue 1.0 g. was extracted a second time with 250 cc. hot pyridine from which on cooling 0.1 g. of dye separated. The first extract was discarded. The crystallized portion as well as the residue had a melting point greater than 325° C. and solutions of both portions in pyridine are orange. The dye is a weak sensitizer. It sensitized a photographic gelatino-silver-bromo-iodide emulsion to 550 mu with no maximum sensitization.

*Example 4.—3 - ethyl-1-phenyl-5-[(3,4-trimethylene-2(3)-benzothiazolylidene) ethylidene]-2-thiohydantoin*

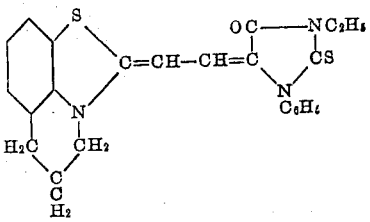

A mixture of 0.4 g. (1 mol.)-β-acetanilidovinyl-3,4-trimethylenebenzothiazolium iodide, 0.2 g. (1 mol) 3-ethyl-1-phenyl-2-thiohydantoin, and 0.12 cc. (1 mol.) triethylamine in 15 cc. absolute ethyl alcohol was refluxed 20 minutes. The reaction mixture was chilled. The dye was collected on a filter, washed well with methanol. Yield: 0.3 g., 82 per cent. It was obtained as purplish crystals with blue reflex, melting at 246° to 247° C. without decomposition, after one extraction with 30 cc. hot methanol and recrystallization of the residue from a pyridine methyl alcohol mixture. A solution of the dye in acetone is orange. The dye is a strong sensitizer, sensitizing a photographic gelatino-silver-chlorobromide emulsion between 470 mu and 620 mu with a maximum at 580 mu.

*Example 5.—3-ethyl-1-phenyl-5-[(3,4-trimethylene-2(3)-benzothiazolylidene)butenylidene]-2-thiohydantoin*

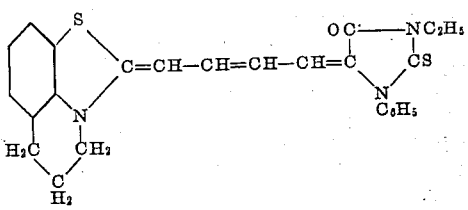

A mixture of 0.5 g. (1 mol.) 2-(4-anilino-1,3-butadienyl)-3,4-trimethylenebenzothiazolium iodide and 0.3 g. (1 mol.) 3-ethyl-1-phenyl-2-thiohydantoin in 25 cc. pyridine was refluxed gently over a free flame for 45 minutes. The pyridine solution assumed a bluish red coloration after 5 to 10 minutes heating. The solvent was removed under diminished pressure by heating on the water bath. The residue was suspended in 20 cc. cold ethyl alcohol, collected on a filter, washed with methanol. Yield: 0.2 g., 50 per cent. The dye was obtained as blue crystals, melting at 265° to 266° C. without decomposition, after an extraction with 20 cc. hot methanol and recrystallization of the residue from a pyridine methyl alcohol mixture. Solution of the dye in acetone is purple. The dye sensitized a photographic silver bromiodide emulsion from 560 mu to 730 mu with a maximum at 675 mu.

In a manner similar to that illustrated in the foregoing examples, merocarbo and merodicarbocyanine dyes containing other heterocyclic nuclei can be obtained from still other heterocyclic compounds containing a ketomethyl group in the ring, e. g. from 2-dialkylamino-4(5)-thiazolones, from 2-diphenylamino-4(5)-thiazolones, from 1,3-diphenyl-2-thiohydantoins, from 1-phenyl-3-alkyl-5-thiopyrazolones, etc.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proved satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

The 2-methyl-3,4-trimethylenebenzothiazolium quaternary salts employed herein can be prepared by oxidizing 1-thioacetyl-1,2,3,4-tetrahydroquinoline with a halogen such as bromine or iodine, as described in our copending application, Serial No. 353,502, filed August 21, 1940 (now United States Patent 2,317,357, dated April 27, 1943).

What we claim as our invention and desire to be secured by Letters Patent of the United States is:

1. The merocyanine dyes which are represented by the following general formula:

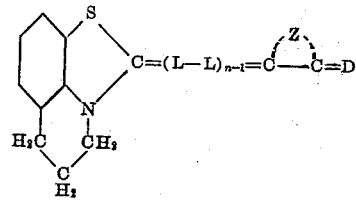

wherein D represents a member selected from the group consisting of oxygen and sulfur, L represents a methine group, $n$ represents a positive integer of from 2 to 3 and Z represents the non-metallic atoms necessary to complete a heterocyclic nucleus containing from 5 to 6 atoms in the ring.

2. The merocyanine dyes which are represented by the following general formula:

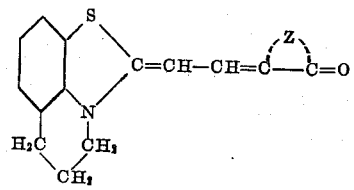

wherein Z represents the non-metallic atoms necessary to complete a rhodanine nucleus.

3. The merocyanine dyes which can be represented by the following general formula:

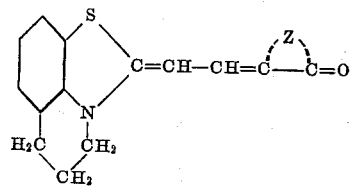

wherein Z represents the non-metallic atoms necessary to complete a 3-alkyl-2-thio-2,4(3,5)-oxazoledione nucleus.

4. The merocyanine dyes which are represented by the following general formula:

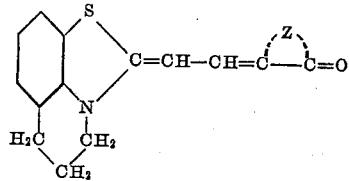

wherein Z represents the non-metallic atoms necessary to complete a 2-thiohydantoin nucleus.

5. The merocyanine dye of the following formula:

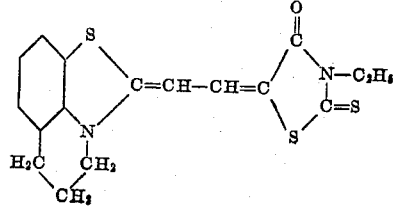

6. The merocyanine dye of the following formula:
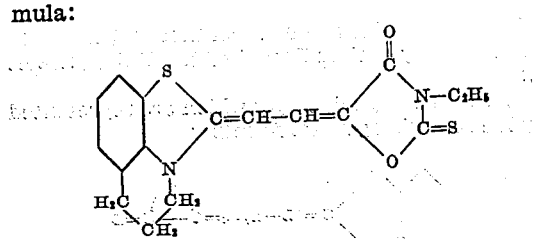
7. The merocyanine dye of the following formula:
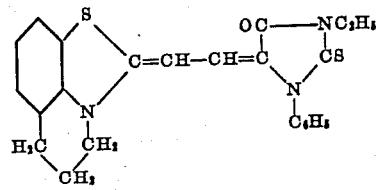
LESLIE G. S. BROOKER.
HOMER W. J. CRESSMAN.